US011214119B2

(12) United States Patent
MacNeille et al.

(10) Patent No.: US 11,214,119 B2
(45) Date of Patent: *Jan. 4, 2022

(54) METHODS AND APPARATUS FOR VEHICLE HVAC CONTROL USING PORTABLE DEVICES

(71) Applicant: Ford Motor Company, Dearborn, MI (US)

(72) Inventors: Perry Robinson MacNeille, Lathrup Village, MI (US); Jeffrey Yeung, Canton, MI (US); Yimin Liu, Ann Arbor, MI (US); Oleg Yurievitch Gusikhin, Commerce Township, MI (US); Omar Makke, Lyon Township, MI (US)

(73) Assignee: Ford Motor Company, Dearborn, MI (US)

( * ) Notice: Subject to any disclaimer, the term of this patent is extended or adjusted under 35 U.S.C. 154(b) by 223 days.

This patent is subject to a terminal disclaimer.

(21) Appl. No.: 16/346,613

(22) PCT Filed: Nov. 1, 2016

(86) PCT No.: PCT/US2016/059881
§ 371 (c)(1),
(2) Date: May 1, 2019

(87) PCT Pub. No.: WO2018/084830
PCT Pub. Date: May 11, 2018

(65) Prior Publication Data
US 2019/0283529 A1 Sep. 19, 2019

(51) Int. Cl.
*B60H 1/00* (2006.01)
*B60K 37/06* (2006.01)

(52) U.S. Cl.
CPC ......... *B60H 1/00657* (2013.01); *B60H 1/008* (2013.01); *B60H 1/00742* (2013.01);
(Continued)

(58) Field of Classification Search
CPC ............ B60H 1/00657; B60H 1/00742; B60H 1/00785; B60H 1/008; B60K 2370/55;
(Continued)

(56) References Cited

U.S. PATENT DOCUMENTS 6,663,010 B2 12/2003 Chene et al.
6,664,899 B1 12/2003 Tsuchihashi
(Continued)

FOREIGN PATENT DOCUMENTS

CA 2570946 A1 * 6/2007 ......... B60H 1/00642
WO 2018084830 5/2018

OTHER PUBLICATIONS

International Searching Authority, "International Search Report and Written Opinion," issued in connection with International Application No. PCT/US2016/059881, dated Jan. 10, 2017, 20 pages.
(Continued)

*Primary Examiner* — Dale W Hilgendorf
(74) *Attorney, Agent, or Firm* — Brandon Hicks; Hanley, Flight & Zimmerman, LLC

(57) ABSTRACT

Methods and apparatus for vehicle HVAC control are disclosed. A disclosed example apparatus includes a portable device interface of a vehicle, the portable device interface to be communicatively coupled with a portable device, a heating, ventilation and air conditioning (HVAC) control system of the vehicle, where the HVAC control system is to be communicatively coupled to the portable device interface. The example apparatus also includes a processor to control the HVAC control system based on signals received at the portable device interface from the portable device.

21 Claims, 11 Drawing Sheets

(52) U.S. Cl.
CPC .......... *B60H 1/00785* (2013.01); *B60K 37/06* (2013.01); *B60K 2370/55* (2019.05); *B60K 2370/573* (2019.05); *B60K 2370/589* (2019.05)

(58) Field of Classification Search
CPC ........ B60K 2370/589; B60K 2370/573; B60K 37/06
See application file for complete search history.

(56) References Cited

U.S. PATENT DOCUMENTS

| | | | |
|---|---|---|---|
| 6,810,309 B2 | 10/2004 | Sadler et al. | |
| 7,013,656 B2 | 3/2006 | Yanagimachi et al. | |
| 7,725,129 B2 | 5/2010 | Grunhold | |
| 8,376,242 B1* | 2/2013 | Uselton | B60H 1/00657 236/51 |
| 8,791,804 B2* | 7/2014 | Campbell | B60R 25/2018 340/438 |
| 8,827,171 B2* | 9/2014 | Choi | B60H 1/00778 236/51 |
| 9,104,537 B1* | 8/2015 | Penilla | B60L 53/305 |
| 9,348,492 B1 | 5/2016 | Penilla et al. | |
| 9,356,466 B2* | 5/2016 | Han | H02J 50/90 |
| 9,428,034 B2* | 8/2016 | Yang | B60H 1/00742 |
| 10,272,920 B2* | 4/2019 | Shikii | B60W 50/14 |
| 10,926,605 B2* | 2/2021 | Salter | A61B 5/681 |
| 2002/0109583 A1* | 8/2002 | Losey | B60H 1/00657 340/5.72 |
| 2008/0297336 A1* | 12/2008 | Lee | H04L 67/04 340/439 |
| 2010/0019896 A1* | 1/2010 | Flick | B60H 1/00392 340/539.11 |
| 2010/0023210 A1* | 1/2010 | Flick | B60W 10/06 701/36 |
| 2012/0067561 A1* | 3/2012 | Bergman | B60H 1/00657 165/257 |
| 2012/0116608 A1* | 5/2012 | Park | H04W 4/44 701/2 |
| 2013/0073388 A1 | 3/2013 | Heath | |
| 2014/0172197 A1 | 6/2014 | Ganz et al. | |
| 2014/0175182 A1* | 6/2014 | Ino | B60H 1/00657 236/51 |
| 2015/0099443 A1* | 4/2015 | Hirabayashi | B60H 1/00657 454/75 |
| 2015/0204556 A1* | 7/2015 | Kusukame | F24F 11/30 165/237 |
| 2016/0016454 A1* | 1/2016 | Yang | B60H 1/00742 701/36 |
| 2017/0287322 A1* | 10/2017 | Drake | G07C 5/008 |

OTHER PUBLICATIONS

The International Bureau of WIPO, "International Preliminary Report on Patentability," issued in connection with International Application No. PCT/US2016/059881, dated May 7, 2019, 8 pages.
Thomas, "Controlling Car through your Mobile Phone," Advances in Automobile Engineering, Open Access Journal, vol. 4, Issue 1, (2015), 5 pages.
Yang et al., "The Effectiveness of Cloud-based Smart In-vehicle Air Quality Management," 2016 IEEE Advanced Information Management, Communicates, Electronic and Automation Control Conference (IMCEC), Oct. 2016, Published in IEEE Explore on Mar. 2, 2017, 5 pages.

* cited by examiner

METHODS AND APPARATUS FOR VEHICLE HVAC CONTROL USING PORTABLE DEVICES

FIELD OF THE DISCLOSURE

This disclosure relates generally to HVAC and, more particularly, to methods and apparatus for vehicle HVAC control using portable devices.

BACKGROUND

Typical known automated heating, ventilation and air conditioning (HVAC) systems in vehicles utilize automatic control of cooling and heating systems in vehicles. For example, in a typical vehicle HVAC system, a vehicle may rely on an integrated temperature sensor as well as an integrated incident radiation sensor (e.g., sunlight detection) to direct control of cooling/heating. Many typical HVAC systems control an air conditioner, for example, based on a measured temperature and/or temperature threshold from one or more temperature sensors present in a cabin of a vehicle.

However, these known vehicle HVAC systems may be limited in terms of control as well as accuracy in characterizing additional cabin parameters beyond a measured temperature and/or incident radiation from sunlight. For example, many known systems do not take into account parameters such as localized thermal flux/temperature gradients and/or heating effects of a cabin. Further, for known systems to account for these parameters, these systems may require extensive wiring, additional components and/or complex integration (e.g., programming systems that are not easy to update/program, etc.) to fully characterize internal environmental conditions of the cabin.

SUMMARY

An example apparatus includes a portable device interface of a vehicle, where the portable device interface is to be communicatively coupled with a portable device, a heating, ventilation and air conditioning (HVAC) control system of the vehicle, where the HVAC control system is to be communicatively coupled to the portable device interface. The example apparatus also includes a processor to control the HVAC control system based on signals received at the portable device interface from the portable device.

An example method includes measuring, via a sensor, sensor data of an environmental condition within a cabin of a vehicle, generating, at a portable device, a control signal based on the sensor data, and controlling, via a processor, a heating ventilation and air conditioning (HVAC) system of the vehicle based on the control signal.

Another example apparatus includes a portable device having a vehicle communication interface to communicate with an interface system of a vehicle, a sensor interface of the portable device in wireless communication with a sensor disposed within or proximate a cabin of the vehicle, and a processor of the portable device to control a heating, ventilation and air conditioning (HVAC) control system of the vehicle via the vehicle communication interface based on sensor data received at the sensor interface.

An example tangible machine readable medium includes instructions, which when executed, cause a processor of a portable device to at least determine a heating, ventilation and air conditioning (HVAC) setting for a vehicle based on sensor data received from a sensor communicatively coupled to the portable device, and direct an HVAC system of the vehicle based on the determined HVAC setting.

Figure 1:
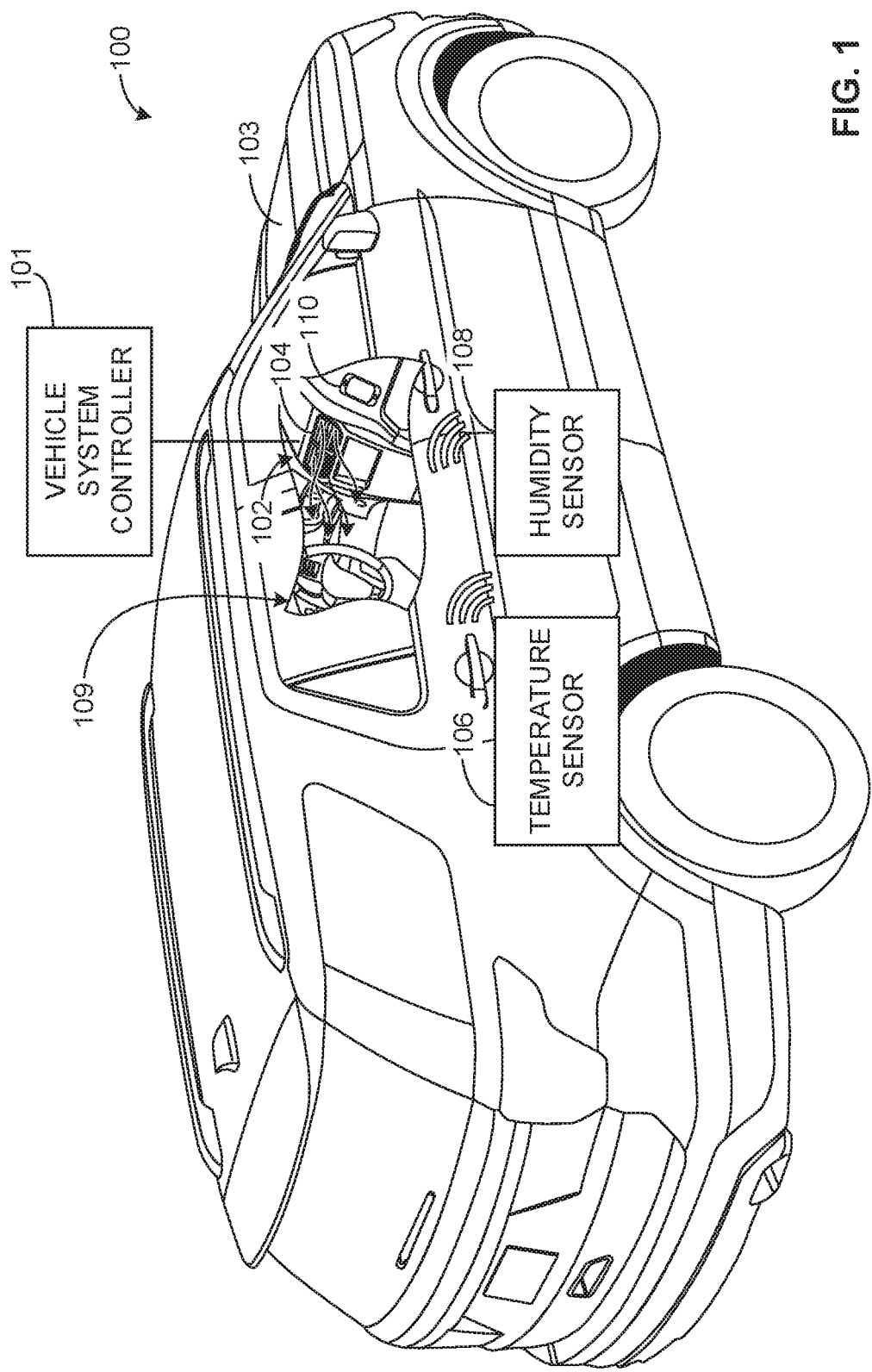
FIG. 1 depicts an example vehicle environmental control system in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Methods and apparatus for vehicle heating, ventilation and air conditioning (HVAC) control using portable devices are disclosed. Known HVAC control systems of vehicles may be limited in terms of control as well as accuracy in characterizing additional cabin parameters besides a measured temperature and/or incident radiation from sunlight. For example, many known vehicle HVAC systems do not take into account localized thermal flux/temperature gradients and/or heating effects within a cabin. Also, typical vehicle HVAC systems do not employ open sourced development and/or an ability to develop specialized applications and/or later added compatibility with newer sensors and/or sensory systems The examples disclosed herein enable highly effective and highly customizable control of vehicle HVAC systems based on measuring sensor data within a vehicle cabin, for example, and/or external data sources (e.g., information received from webs services, etc.). As a result, the examples disclosed herein utilize a portable device disposed within a cabin of a vehicle, for example, to obtain sensor data from a sensor (e.g., a passively powered sensor, a wireless sensor) in the cabin and/or a sensor external to the vehicle. In particular, the portable device may receive/obtain sensor data, processed/filtered sensor data and/or data associated with the sensor data (e.g., control inputs based on the sensor data) to direct an HVAC system of the vehicle. In some examples, the portable device directly controls the HVAC system based on analyzing sensor data of a sensor that is communicatively coupled to the portable device instead of a sensor that is integrated (e.g., wired into the vehicle), thereby enabling a very cost-effective solution by potentially eliminating standard integrated vehicle systems, which may require many components, programming integration and/or additional wire routing, etc.

As used herein, the term "portable device" may refer to any mobile device, cell phone, tablet, laptop and/or portable computer. As used herein, the term "stuffiness" refers to a measured (e.g., an amount or portion of air that is recirculated within an enclosed volume and/or isolated from an external air source) and/or a perceived air quality level (e.g., a subjective standard based on personal preference(s)), which is generally decreased as an amount, portion or percentage of recirculated air in a vehicle is increased.

FIG. 1 depicts an example vehicle environmental control system 100 in accordance with the teachings of this disclosure. The example environmental control system 100, which is implemented in an example vehicle 103, includes an example vehicle system controller 101, and a vehicle dashboard 102, which includes a vehicle HVAC actor (e.g., vents) 104. According to the illustrated example, the environmental control system 100 also includes a temperature sensor (e.g., a wireless temperature sensor) 106 and a humidity sensor (e.g., a wireless humidity sensor) 108, both of which are disposed within a cabin 109. The environmental control system 100 of the illustrated example also includes a portable device (e.g., a mobile device, a cell phone, a tablet, a laptop, etc.) 110, which may be operated by a user present within the cabin 109. In this example, the temperature sensor 106 and the humidity sensor 108 are both wirelessly communicatively coupled to the portable device 110.

To direct control of the environmental control system 100 and/or the vehicle HVAC actor 104, the portable device 110 of the illustrated example first detects at least one internal environmental measurement/condition (e.g., an atmospheric property, a humidity, a solar radiation level, air movement and/or a chemical concentration) of the cabin 109 measured at the temperature sensor 106 and/or the humidity sensor 108. In turn, the portable device 110 of the illustrated examples utilizes the at least one internal environment measurement/condition to direct the environmental control system 100 and/or the vehicle HVAC actor 104, thereby varying/altering an environmental condition(s) of the cabin 109. In particular, the example portable device 110 analyzes the environmental condition(s) based on the at least one internal environment measurement/condition.

In this example, the portable device 110 directly controls (e.g., via control signals, input command signals) the environmental control system 100. However, in other examples, the portable device 110 relays the sensor data from the temperature sensor 106 and/or the humidity sensor 108 to the example vehicle system controller 101 which, in turn, utilizes to direct control of the vehicle HVAC actor 104. Additionally or alternatively, the example vehicle system controller 101 at least partially controls (e.g., in conjunction with the portable device 110) the vehicle HVAC actor 104 based on other internal sensors (e.g., wired sensors) corresponding to the cabin 109. In such examples, the vehicle system controller 101 may forward sensor signals to the portable device 110.

While the temperature sensor 106 and the humidity sensor 108 are shown in this example, any appropriate number, type and/or combination of sensors may be used. For example sensors, which may be external (e.g., an external sensor) or internal (e.g., an internal sensor) to a vehicle, can include, but are not limited to, particulate sensors (e.g., biological sensors, smoke sensors that detect polycyclic aromatic hydrocarbons, detectors of soot, mineral or oil, etc.), chemical/gas sensors (e.g., humidity, biological byproducts, plastic evaporation, combustion byproducts, etc.), thermodynamic sensors (e.g., temperature sensors, barometric sensors, solar radiation and/or position sensors, three-dimensional cabin airflow), and/or biometric sensors (e.g., skin temperature, metabolic rate, ketosis breath, breath, infrared, facial expressions, spectral analysis, etc., electrocardiogram (ECG/EKG), brain waves, driver awakeness (eyes), etc.).

Figure 2:
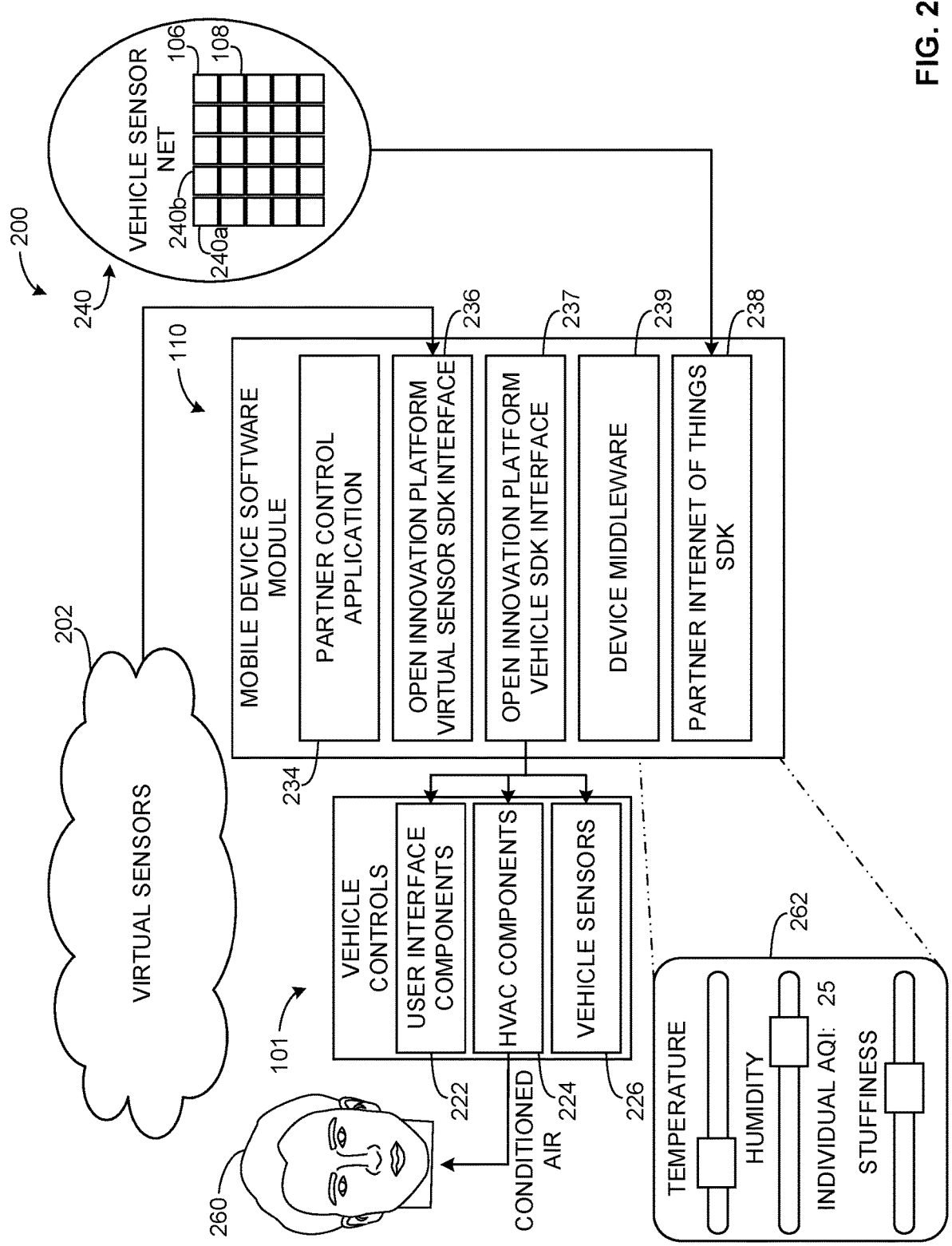
FIG. 2 is a schematic representation of an example vehicle cabin control system that may be used to implement the example vehicle environmental control system of FIG. 1.

FIG. 2 is a schematic representation of an example vehicle cabin condition control system 200 that may be used to implement the example vehicle environmental control system 100 of FIG. 1. The example vehicle cabin condition control system 200 includes virtual sensors (e.g., a virtual sensor interface) 202, and the vehicle system controller 101, which includes user interface components 222, HVAC components/actors (e.g., the HVAC actor/vent 104) 224 and vehicle sensors (e.g., integrated vehicle sensors, internal cabin sensors, hardwired sensors, etc.) 226. The example vehicle cabin condition control system 200 also includes the portable device 110, which includes a partner control application 234, an open innovation platform virtual sensor software development kit (SDK) sensor interface 236, an open innovation platform vehicle platform SDK interface 237, a partner (e.g., open innovation) internet of things (JOT) device(s) SDK interface 238, and device middleware 239. In this example, the portable device 110 is communicatively coupled to the vehicle system controller 101 as well as a vehicle sensor net 240 via the partner internet of things device(s) interface 238. The vehicle sensor net 240 of the illustrated example include sensors 240 (herein designated as 240a, 240b, etc.), the temperature sensor 106 and/or the humidity sensor 108.

To control the HVAC components acting upon a vehicle occupant 260 (e.g., a degree of cooling/heating and/or humidity encountered by the vehicle occupant 260), the portable device 110 of the illustrated example utilizes data from the vehicle sensor net 240. For example, the portable device 110 may receive temperature measurements from the temperature sensor 106 and interpret and/or analyze the signals via the partner control application 234, the open innovation platform virtual sensor software development kit (SDK) sensor interface 236, the open innovation platform interface 237 and/or the partner internet of things SDK 238. In turn, the portable device 110 of the illustrated example directs/controls the vehicle system controller 101 and/or the HVAC components 224. Additionally or alternatively, in some examples, the portable device 110 utilizes measured data (e.g., data pertaining to an environmental/environment condition of a cabin) and/or external condition data (e.g., external environmental condition data) from the virtual sensors 202. As will be described in greater detail below in connection with FIG. 8, the virtual sensors 202 may include sensor data taken at other vehicle(s), other location(s), base station(s) (e.g., weather stations) and/or web services that forward data/information to a virtual sensor network. As a result, the sensor data and/or environmental condition data from the virtual sensors 202 can be used by the portable device 110 to improve control of the HVAC components 224, for example. For example, downloaded data received by the portable device 110 from the virtual sensors 202 may be used to execute a purge of air from the cabin 109 (e.g., based on a large amount of pollen particles, polluted air conditions, smoke, etc.).

According to the illustrated example, an example interface (e.g., a screen display interface) 262 of the portable device 110 is shown. In particular, the interface 262 of the illustrated example is displayed on a screen of the portable device 110 and depicts temperature, humidity, an air quality index (AQI) and/or a stuffiness level. In this example, the AQI is personalized based on an individual's air preferences (e.g., an individual passenger having a specific allergy to pollen is taken into account based on the individual's needs/preferences). In some examples, the interface 262 is also accompanied by a voice interface to allow the vehicle occupant 260 to adjust a temperature, humidity and/or a portion/ratio of outside air that is allowed into the cabin, for example.

In some examples, at least one sensor of the vehicle sensor net 240 is passively (e.g., inductively powered, passively powered) by the portable device 110 and/or a magnetic field generated by the vehicle system controller 101 and/or other vehicle systems (e.g., a vehicle magnetic field generator). Alternatively, in some examples, at least some of the functionality, analysis and/or logic used to control the HVAC components 224 is implemented by the vehicle system controller 101 (e.g., in conjunction with the portable device 110). In some examples, the device middleware 239 facilitates/provides communication between the partner control application 234 and other interfaces and/or programs of the portable device 110.

In some examples, the user interface components 222 include any of, but are not limited to, touch displays, voice interaction systems, mechanical/physical controls and/or any other appropriate type of interactive device. In some examples, the HVAC components include, but are not limited to, a blower, a chiller, a heater, ventilation doors and/or windows, etc. For example, a position and/or degree of openness of a window may be controlled/varied. The vehicle sensors 226 may include, but are not limited to, location/position sensors, rotation sensors, air quality sensors, handling sensors, vibration sensors and/or powertrain sensors, etc.

While a single portable device 110 is shown, multiple portable devices 110 may communicate with the vehicle sensor net 240 to provide cabin condition data, localized cabin data (e.g., localized temperatures and/or heat fluxes) and/or also at least partially control the HVAC components 224 and/or portions of the HVAC components 224 (e.g., the rear seat HVAC systems, etc.). In such examples, the multiple portable devices 110 may tailor different HVAC controls and/or HVAC settings (e.g., determined HVAC settings) to different vehicle occupants (e.g., rear passengers, a front passenger, etc.) based on respective personal preferences (e.g., personal preferences determined based on corresponding/respective portable devices 110). Additionally or alternatively, at least one sensor of the example vehicle sensor net 240 measures biometric data of a passenger (e.g., heart rate, brain activity, facial recognition, etc.). In some examples, this biometric data is used to determine and/or access user preferences (e.g., desired temperature(s) and/or humidity, desired cabin air purge criteria, etc.).

Figure 3:
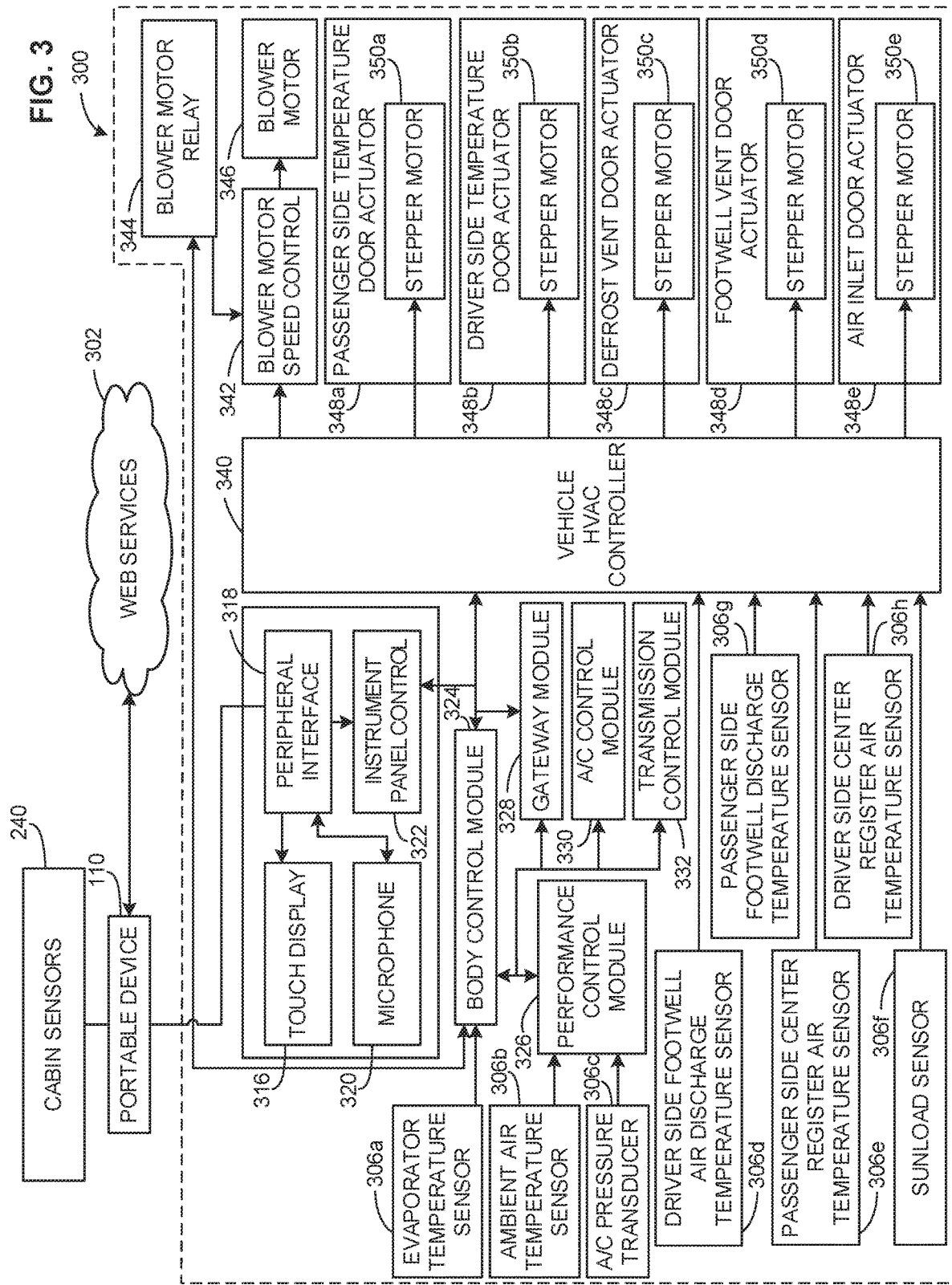
FIG. 3 is a schematic representation of a vehicle heating, ventilation and air conditioning (HVAC) system that may be implemented with the examples disclosed herein.

FIG. 3 is a schematic representation of a vehicle heating, ventilation and air conditioning (HVAC) system 300 that may be implemented with the examples disclosed herein. For example, the HVAC system 300 may be implemented in the example vehicle system controller 101 and/or by the HVAC components 224 described above in connection with FIG. 2. According to the illustrated example, the vehicle HVAC system 300 is communicatively coupled to the portable device 110 which, in turn, is communicatively coupled to the sensor net 240 (e.g., cabin sensors, internet of things sensors, etc.) and web services 302. In this example, the web services 302 provide virtual sensor information, driver/occupant preference data, and/or external condition data (e.g., weather information, traffic, external air conditions, pollution patterns, allergy/pollen information, etc.).

The HVAC system 300 of the illustrated example includes sensors 306 (herein designated as sensors 306a-306h), a touch display 316, a peripheral interface 318, a microphone 320, an instrument panel control 322, a body control module 324, a performance control module 326, a gateway module 328, an air conditioning control module 330, and a transmission control module 332. The example HVAC system 300 also includes a vehicle HVAC controller (e.g., an HVAC controller module) 340 that is communicatively coupled to a blower motor speed control 342 which, in turn, is communicatively coupled to a blower motor relay 344. In some examples, the blower motor relay 344 is also communicatively coupled to the body control module 324. According to the illustrated example of FIG. 3, the HVAC controller module 340 directs/controls actuators 348 (herein designated as actuators 348a-348e), each of which have respective stepper motors 350 (herein designated as actuators 350a-350e).

To control the HVAC system 300, the portable device 110 of the illustrated example sends commands to the peripheral interface 318. In particular, the portable device utilizes cabin sensor(s) (e.g., inductively powered cabin sensors) of the sensor net 240 to determine the commands that direct the HVAC system 300. Additionally or alternatively, the portable device 110 determines the commands based on data/information received via the web services 302.

To direct the HVAC controller module 340 of the illustrated example, the body control module 324, which is also used to direct the HVAC controller 340, utilizes data measured at the sensor 306a and the performance control module 326, which receives measurements from the sensors 306b and 306c, provides inputs to the body control module 324. Further, the sensors 306d-306h of the illustrated example provide measurements directly to the HVAC controller module 340 and devices controlled by the HVAC controller module 340 are directed at least partially based on the measurements provided by the sensors 306d-306h.

According to the illustrated example, the HVAC controller module 340 controls the blower motor speed control (e.g., the air conditioner blower motor speed control) 342 which, in turn, directs the blower motor 346. Further, in this example, the HVAC controller module 340 directs the actuators 348a-348e. In some examples any combination and/or portion of the actuators 348a-348e are controlled (e.g., independently controlled) to vary an environmental condition of a vehicle cabin (e.g., the cabin 109).

In some examples in which a vehicle HVAC system is being upgraded/retrofitted to include functionality of the examples disclosed herein, a pre-existing peripheral interface may be replaced with the example peripheral interface 318 to incorporate wireless communications with and/or control the portable device 110, for example. Additionally or alternatively, the portable device 110 includes custom HVAC software, custom HVAC sensor interface(s) and/or a custom HVAC software programming interface (e.g., an application programming interface (API)). Further, a sensor (e.g., a passive sensor, an internet of things sensor, etc.) that is communicatively coupled to the portable device 110 may be placed, coupled and/or mounted within a cabin of the vehicle that is being upgraded/retrofitted without adding wiring and/or other internal components to support operation of the sensor, thereby enabling a simple and cost-effective solution to enhance sensor capabilities and/or cabin analysis.

Figure 4:
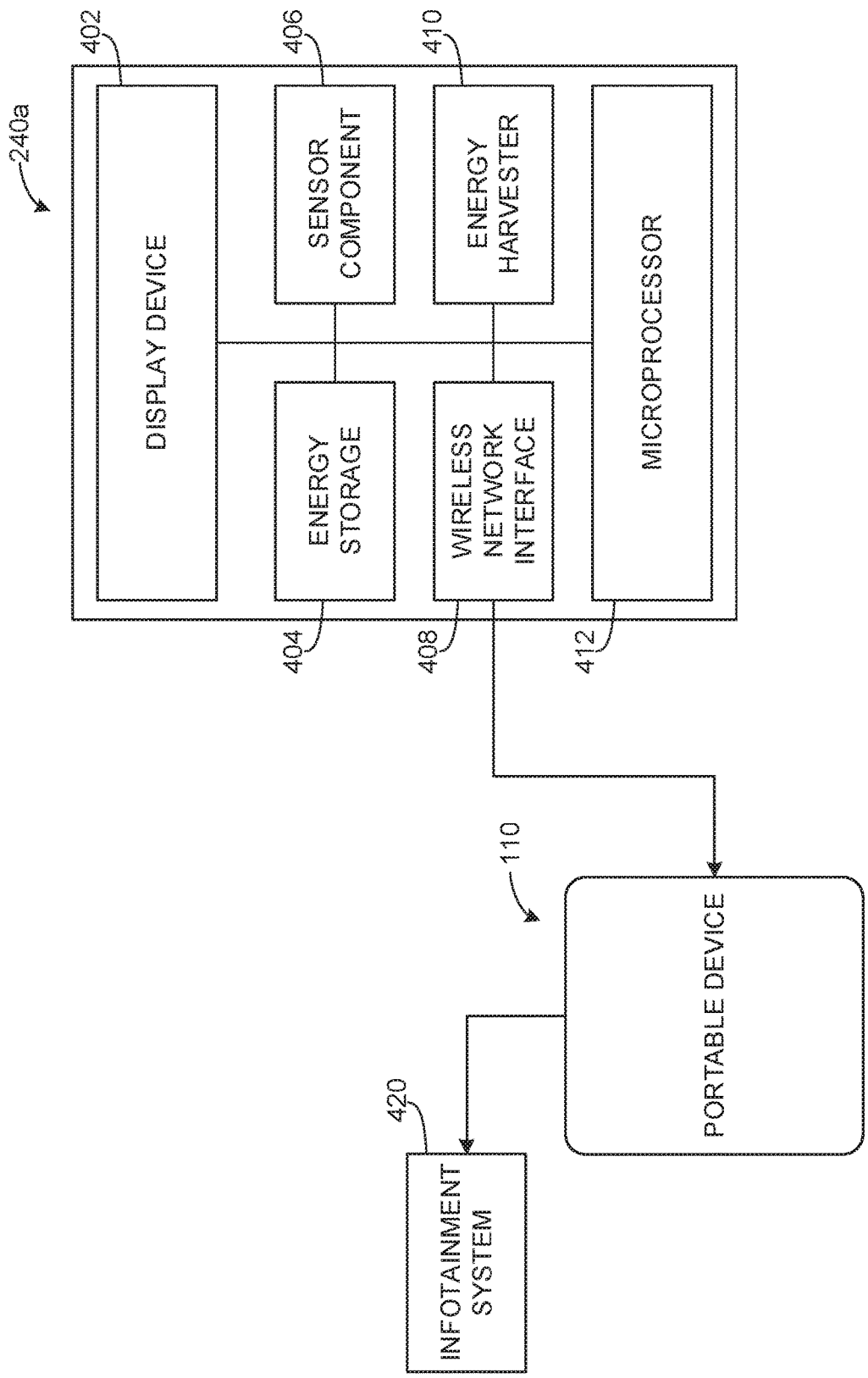
FIG. 4 is a schematic representation illustrating an example sensor that may be implemented in conjunction with the examples disclosed herein.

FIG. 4 is a schematic representation illustrating the example sensor 240a that may be implemented in conjunction with the examples disclosed herein. The sensor 240a of the illustrated example includes a display device 402, energy storage (e.g., a battery and/or capacitor) 404, a sensor component (e.g., a sensor portion, a sensing portion, etc.) 406, a wireless network interface 408, an energy harvester 410 and a microprocessor 412. In this example, the sensor 240a is communicatively coupled to the portable device 110 which, in turn, is communicatively coupled (e.g., in wireless communication) to an infotainment system 420 of the vehicle. In this example, the sensor 240a has been mounted within or proximate a cabin interior without wiring or corresponding components/circuitry that would be typically necessary to integrate such devices with a vehicle control system, thereby providing a cost effective solution that integrates numerous sensors of the cabin without adding additional components, system integration and/or wiring.

In operation, the example sensor 240a wirelessly transmits sensor data to the portable device 110 so that the portable device 110 may be used to control an HVAC system. To power the sensor 240a, in some examples, the energy harvester 410 utilizes mechanical energy harvesting (e.g., vibration, acceleration, sounds and/or human interaction such as pushing a button, opening a door, using pedals, etc.) and/or magnetic field induction (e.g., via a wireless power transfer device) to generate power to operate the sensor 240a. In some examples, the energy storage 404 stores energy generated at the energy harvester 410. According to the illustrated example of FIG. 4, the wireless network interface 408 transmits sensor data from the sensor component 406 to the portable device 110. In some examples, the microprocessor 412 directs the wireless network interface 408 to transmit the sensor data and/or generates an analysis of the sensor data from the sensor component 406 to be transmitted to the portable device 110 via the wireless network interface 408.

According to the illustrated example, any of the sensors may measure parameters including, but not limited to, temperature, humidity, chemicals produced in the cabin (e.g., water ($H_2O$), carbon dioxide ($CO_2$), volatile organic compounds (VOC), particulates, etc.), chemicals stored in cabin air, chemicals stored in external air, energy produced in the cabin (e.g., device operation, people, etc.), energy stored in the cabin (e.g., enthalpy, temperature, vapors, etc.), energy inputs to the HVAC system, energy output by the HVAC system (e.g., temperature, air movement, etc.) and/or a rate of change of any of the above, etc.

In some examples, the display device 402, which may be an LED or an LCD display, for example, is used to convey a status of the sensor 240a (e.g., whether the sensor 240a is collecting the sensor data). In some examples, the sensor 240a does not include the energy storage 404 and, instead, relies primarily on inductive and/or inductively generated power (e.g., an inductive field provided by the portable device 110).

Figure 5:
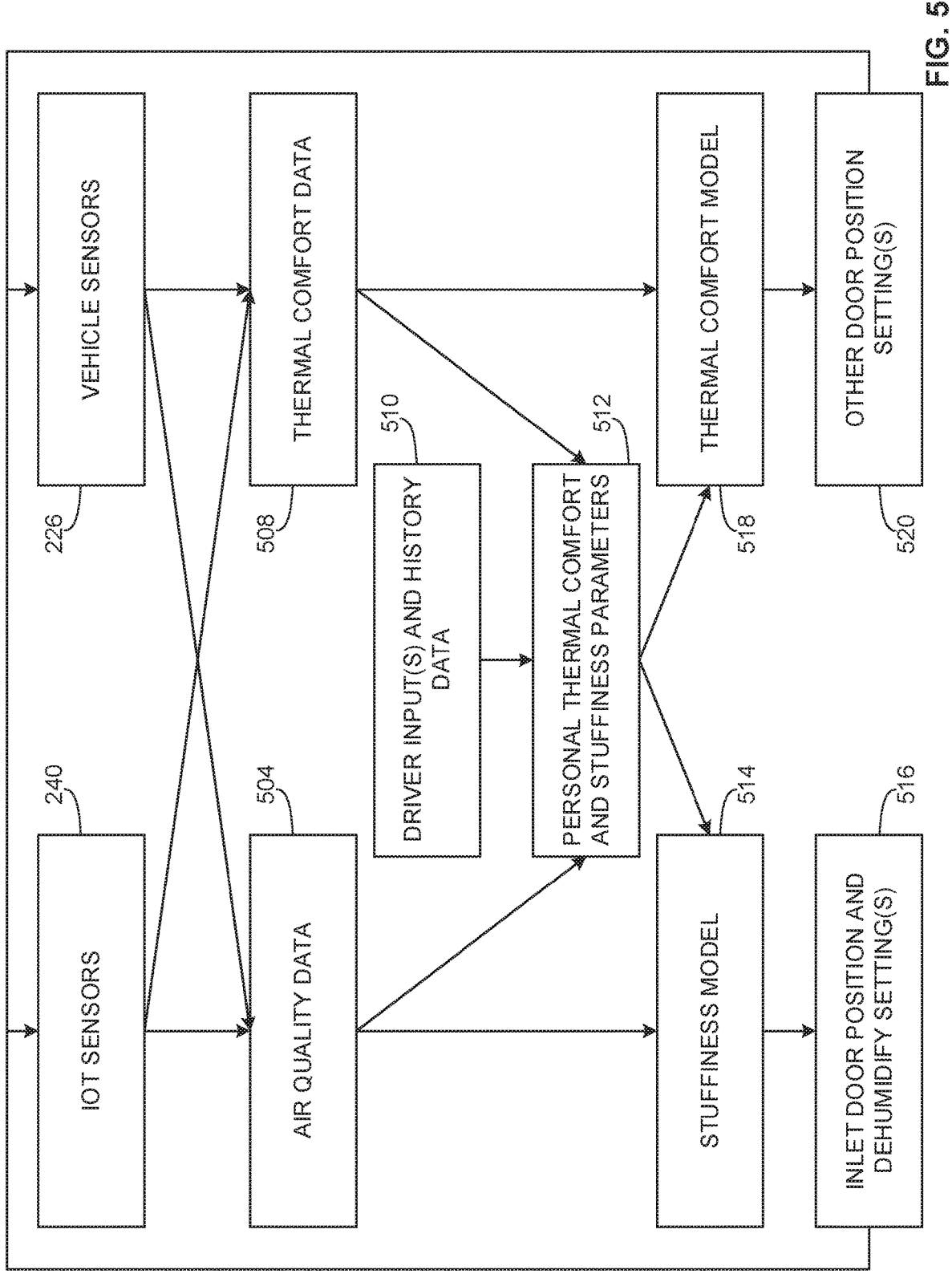
FIG. 5 is a schematic overview illustrating an example modelling algorithm that may be implemented in the examples disclosed herein.

FIG. 5 is a schematic overview illustrating an example modelling algorithm that may be implemented in the examples disclosed herein. According to the illustrated example of FIG. 5, the sensor net 240 (e.g., the internet of things (IOT) sensors) and the vehicle sensors 226 gather sensor data. In addition, measured air quality data 504 as well as measured thermal comfort data 508 are used in conjunction with the sensor data from the sensor net 240 as well as the vehicle sensor(s) 226 to develop, analyze, refine and/or modify a stuffiness model 514 and/or a thermal comfort model 518. Additionally or alternatively, driver/passenger/occupant input and personalized history data 510 along with associated personal thermal comfort and stuffiness parameters 512 are taken into account (e.g., via the web services 302) when developing and/or refining the stuffiness model 514 and/or the thermal comfort model 518. In some examples, the air quality data 504 and the thermal comfort data 508 are used in conjunction with the personal thermal comfort and stuffiness parameters 512 to generate parameters for the stuffiness model 514 and/or the thermal comfort model 518.

A thermal comfort model 518 may include at least one of temperature, temperature in combination with humidity, or a combination of temperature, humidity, solar load and/or air movement, etc. depending on a type of thermal comfort model utilized.

In some examples, enthalpy is used by the thermal comfort model 518 as a measure of the amount of energy an HVAC control system needs to change an existing state (e.g., existing thermodynamic state) of the cabin toward a comfort zone defined by a thermal comfort model. Additionally or alternatively, another parameter to measure for the thermal comfort model 518 is an exchange of parameters that affect the thermal comfort of a vehicle cabin, whereby the exchange occurs between the inside and outside of the vehicle cabin. In some examples, the exchange includes at least one of radiation, conduction, convection, leakage, HVAC energy and energy inputs to the cabin from the HVAC control system.

In some examples, the stuffiness model 514 is used to set an air inlet door position and/or dehumidify the cabin 516. Additionally or alternatively, the thermal comfort model 518 is used to generate positions of other doors 520 (besides the inlet door). In some examples, at least one of the air quality data 504, the thermal comfort data 508 or driver inputs and history data 510 are collected via the web services 302.

The example of FIG. 5 only illustrates an example modelling analysis that may be implemented in the examples disclosed herein. Any of the inputs, parameters, input flows and/or analysis may be modified and/or re-directed, as appropriate. Any appropriate analysis, algorithm and/or data type may be used, as appropriate.

Figure 6:
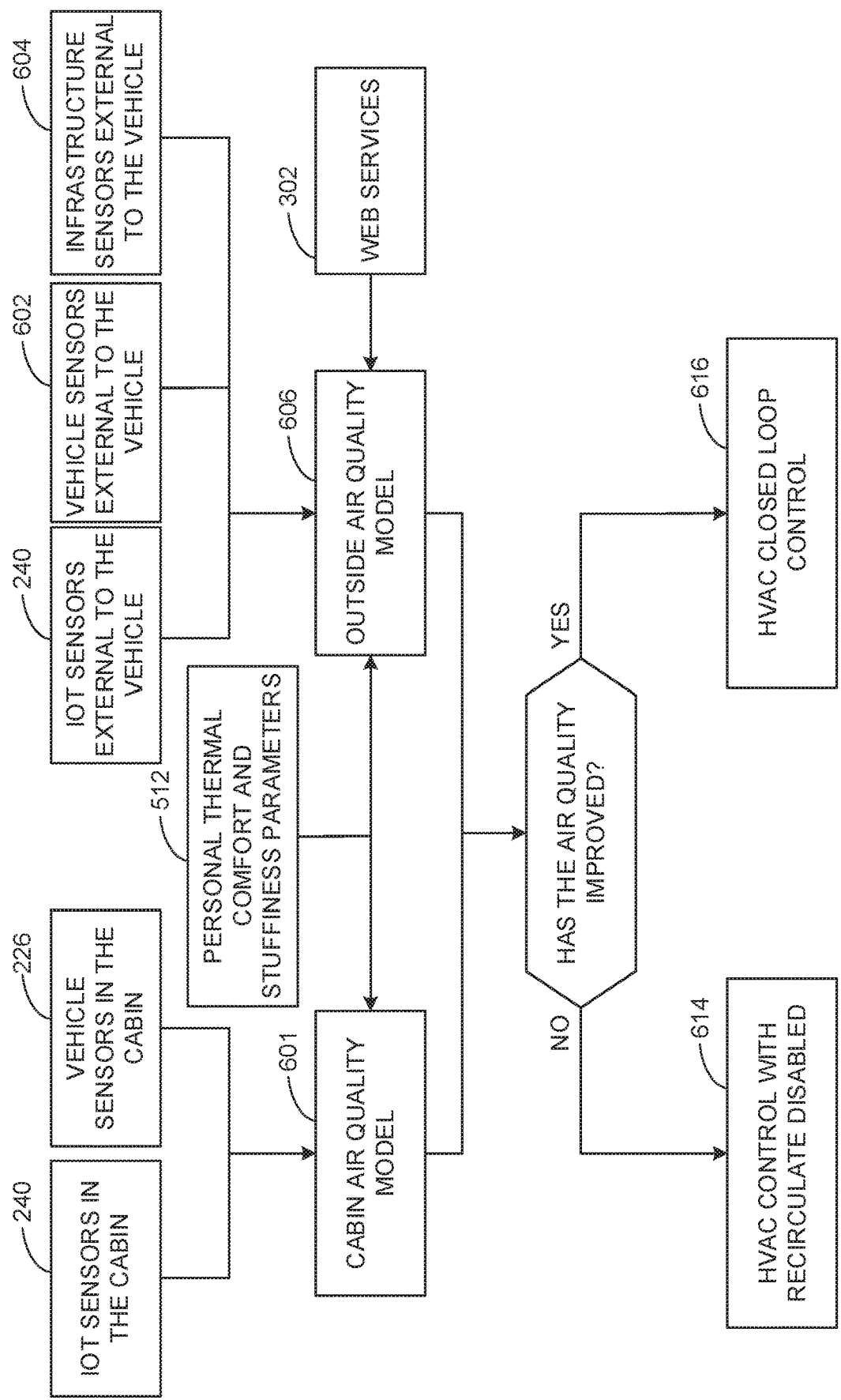
FIG. 6 is a schematic overview illustrating another example modelling algorithm that may be implemented in the examples disclosed herein.

FIG. 6 is a schematic overview illustrating another example algorithm that may be implemented in the examples disclosed herein. In particular, this example depicts switching an HVAC system of the vehicle between re-circulation and disabling re-circulation (e.g., external air is drawn/brought in, as well as any varying degree therebetween. According to the illustrated example of FIG. 6, sensors 240 located in a cabin of a vehicle as well as vehicle sensors 226, which may be located in the cabin, are used to develop a cabin air quality model 601. Similarly, sensors 240 outside the vehicle, vehicle sensors 602 that are outside/external to the vehicle, and infrastructure sensors external to the vehicle 604 are used to develop an outside air quality model 606. Additionally or alternatively, data from the web services 302 is used to generate the outside air quality model 606.

To determine whether an HVAC system of the vehicle is to remain in a closed loop control/recirculating mode, the outside air quality model 606 along with the cabin air quality model 601 are analyzed to determine whether the cabin air quality 601 has improved. If the air quality has not improved, the HVAC system enters a mode 614 in which recirculation is disabled. Alternatively, if the air quality has not improved, the HVAC system enters a mode 616 in which the HVAC system is maintained in a closed (e.g., a recirculating) loop. Additionally or alternatively, the HVAC system is controlled to execute a cabin purge of air within the cabin.

Figure 7:
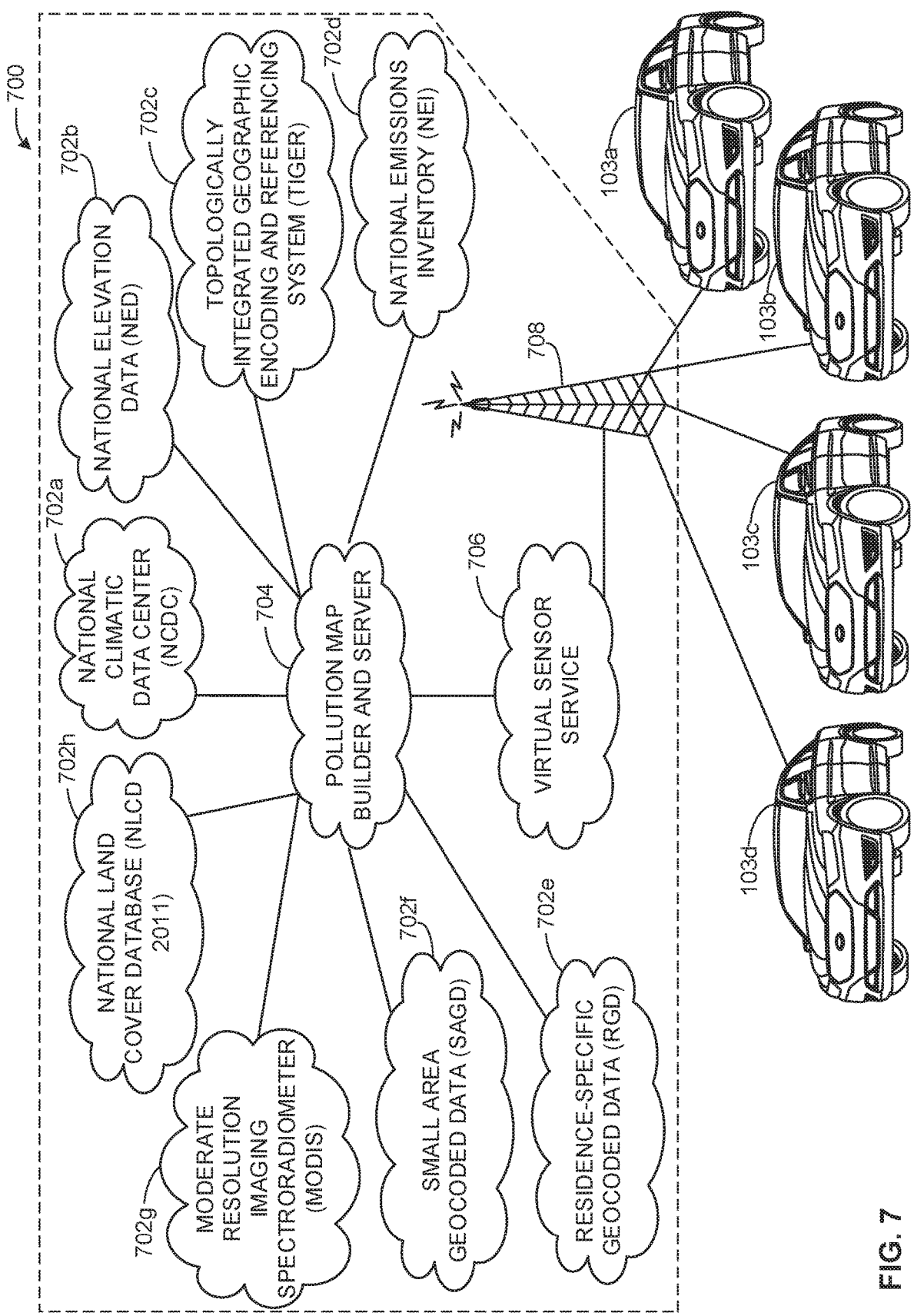
FIG. 7 is a schematic representation of an example virtual sensor network that may be implemented in conjunction with the examples disclosed herein.

FIG. 7 is a schematic representation of an example virtual sensor network 700 that may be implemented in conjunction with the examples disclosed herein. In particular, the example web services 302 and/or the example virtual sensors 202 may be implemented by the example virtual sensor network 700. The sensor network 700 of the illustrated example includes data sources (e.g., online data sources, web data sources, mapping services, etc.) 702a-702h, a pollution map builder/server 704, a virtual sensor service 706 and a communication system 708, which is communicatively coupled to networked vehicles 103a-103d, all of which provide measured sensor data and/or analysis data related to the sensor data to the example virtual sensor network 700.

To provide location-based external condition data and/or geography-based external condition model(s) to the portable device 110 and/or the vehicles 103, the pollution map builder/server 704 of the illustrated example gathers data from at least one of the data sources 702a-702h to develop a geography-based model of the external condition(s). As a result, the communication system 708 may transmit the location-based external condition data to the vehicles 103 so that the environmental control system 100 of each vehicle 103 can appropriately control the HVAC components 224 described above in connection with FIG. 2.

In some examples, the vehicle(s) 103 and/or the respective portable device(s) 110 transmit sensor data to the virtual sensor network 700 so that the virtual sensor network 700 can analyze (e.g., by utilizing the external data sources 702a-702h) the sensor data and return HVAC settings (e.g., determined settings, recommended settings, etc.) based on this analysis. As a result, the virtual sensor service 706 compares and/or analyzes the transmitted sensor data to determine HVAC settings based on analyzing previous data and/or patterns. According to such examples, the HVAC settings (e.g., learned settings) are forwarded to the portable device(s) 110 so that the portable device(s) 110 can direct control of the respective HVAC system 300. Additionally or alternatively, the HVAC settings are used by the vehicle system controllers 101 to direct the HVAC systems 300.

In some examples, data measured at any of the vehicles 103a-103d may be used to develop the location-based external condition data. For example, at least one of the vehicles 103a-103d may measure an external condition (e.g., an ambient temperature, a particulate reading) and relay that external condition along with a measured position (e.g., a measured global positioning system (GPS) position) of the respective vehicle of the vehicles 103a-103d to the virtual sensor service 706 and/or the pollution map builder/server 704 so that the location-based external condition data can be aggregated/collected for use by other vehicles. In some examples, the location-based external condition data is based solely on sensor measurements taken at the vehicles 103a-103d.

Figure 8:
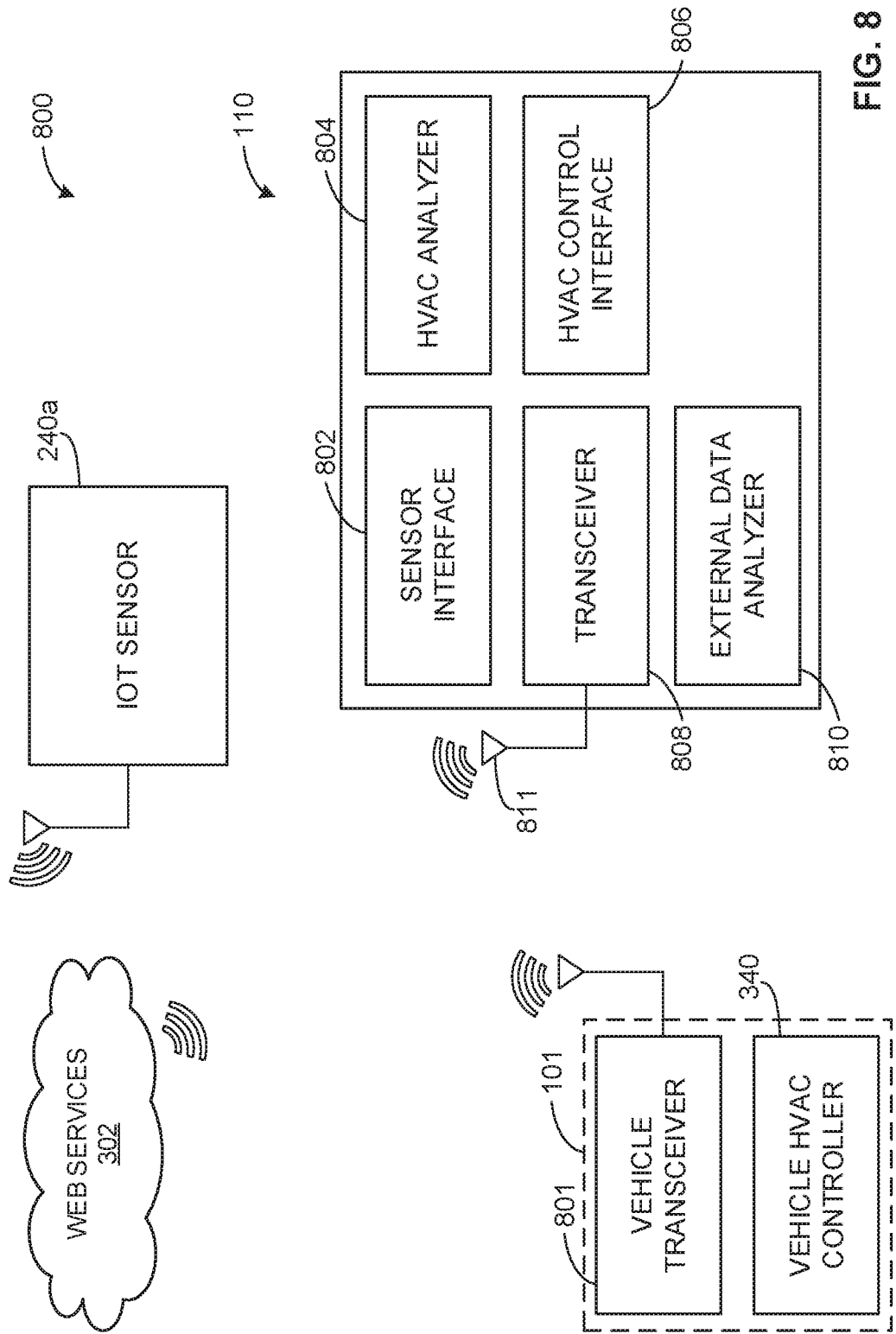
FIG. 8 is a schematic overview of an example HVAC control system that may implement the examples disclosed herein.

FIG. 8 is a schematic overview of an example HVAC control system 800 of a vehicle that may implement the examples disclosed herein. The example HVAC control system 800 includes the sensor (e.g., the IOT sensors) 240a, the web services 302, the vehicle system controller 101, which includes a vehicle transceiver 801 as well as the vehicle HVAC controller 340. The example HVAC control system 800 also includes the portable device 110, which includes a sensor interface 802, an HVAC analyzer 804, an HVAC control interface 806, a transceiver 808, an external data analyzer 810 and a wireless antenna 811.

To detect at least one condition of the vehicle, the sensor 240a of the illustrated example measures an internal or external parameter of the vehicle and, in turn, transmits a signal corresponding to the measurement to the portable device 110 (e.g., to the antenna 811 from which the transceiver 808 receives the signal). According to the illustrated example, the sensor interface 802 forwards the signal to the HVAC analyzer 804, which determines and/or analyzes a condition of the vehicle (e.g., a condition of a vehicle cabin) based on the signal. Additionally or alternatively, the external data analyzer 810 analyzes external conditions of the vehicle, which may be received from the web services 302 and/or external vehicle sensors that are communicatively coupled to the portable device 110.

To direct and/or partially direct (e.g., control portions of) the HVAC system 300, the example HVAC analyzer 804 determines HVAC setting(s) (e.g., potential HVAC settings(s)) based on the analyzed condition of the vehicle. This analysis may be customizable, via a programmable software development kit (SDK), to vary measured parameters (e.g., different sensor types) and/or to perform the analysis of the vehicle condition in a customizable manner. In other words, the analysis of the vehicle condition and/or the types of parameters measured may be customizable based on programming and/or applications used to interact with the example HVAC analyzer 804. In other examples, the analysis is performed and/or partially performed by the web services 302 and/or the virtual sensor interface 700. Once the analysis is performed, the HVAC analyzer 804 relays an HVAC setting (or multiple HVAC settings) and HVAC input control commands to the HVAC control interface 806 which, in turn, forwards the HVAC setting and/or command to the example transceiver 808. According to the illustrated example, the transceiver 808 forwards the HVAC setting and/or command to the vehicle transceiver 801 of the HVAC system 300 which, in turn, forwards the HVAC setting and/or command to the vehicle HVAC controller 340 to direct the HVAC system 300.

In some examples, the external data analyzer 810 receives personalized vehicle occupant information, whereby the HVAC analyzer 804 performs the vehicle condition analysis at least partially based on this personalized information. In some other examples, the sensor 240a is communicatively coupled to the vehicle transceiver 801. Additionally or alternatively, the vehicle HVAC controller 340 may at least partially analyze the aforementioned vehicle condition. In some examples, the vehicle HVAC controller 340 and the HVAC analyzer work in tandem to analyze the vehicle condition. In some examples, the HVAC analyzer 804 is implemented by a custom application (e.g., not developed by a manufacturer of the vehicle, an application developed on an SDK, an open-sourced software application, etc.) of the portable device 110.

Figure 9:
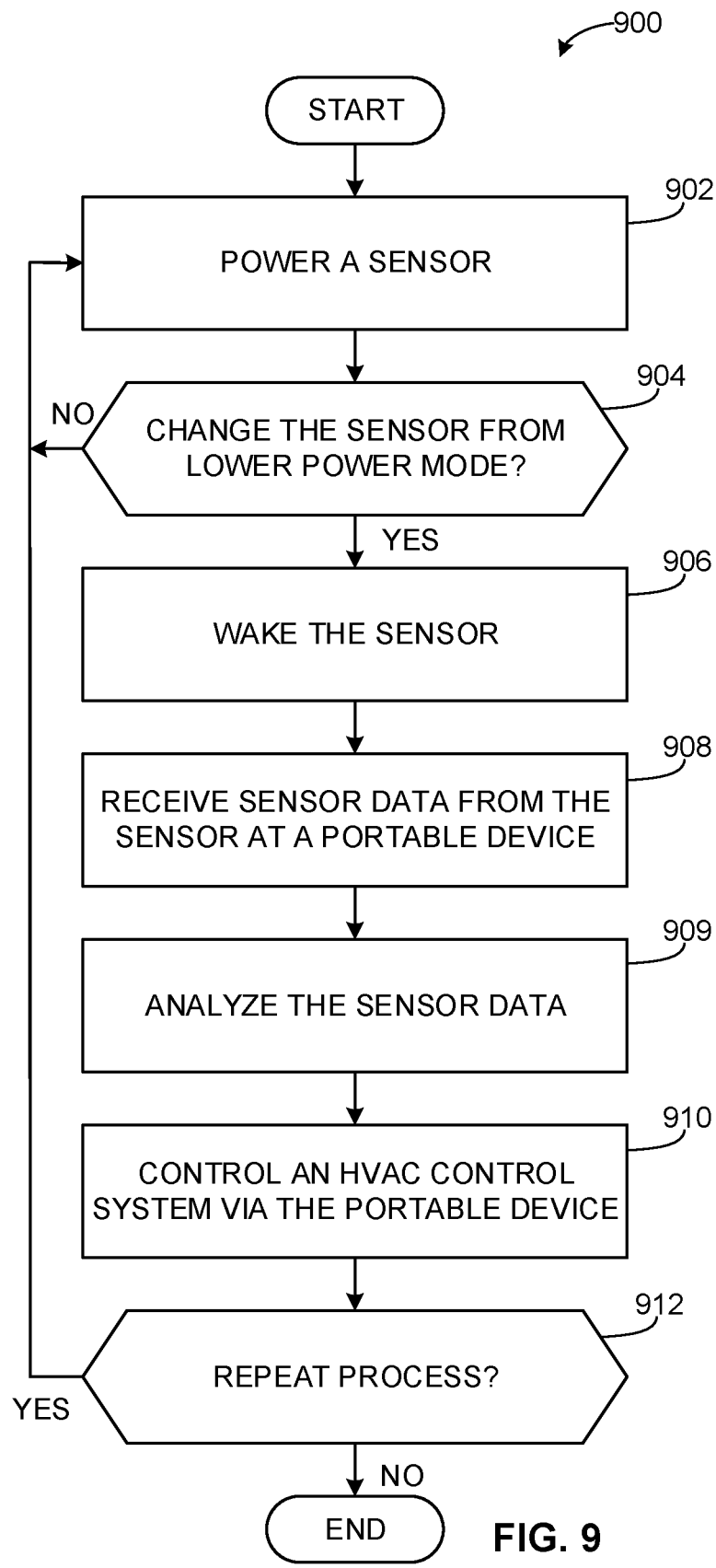
FIG. 9 is a flowchart representative of an example method that may be implemented by the example HVAC control system of FIG. 8.
Figure 10:
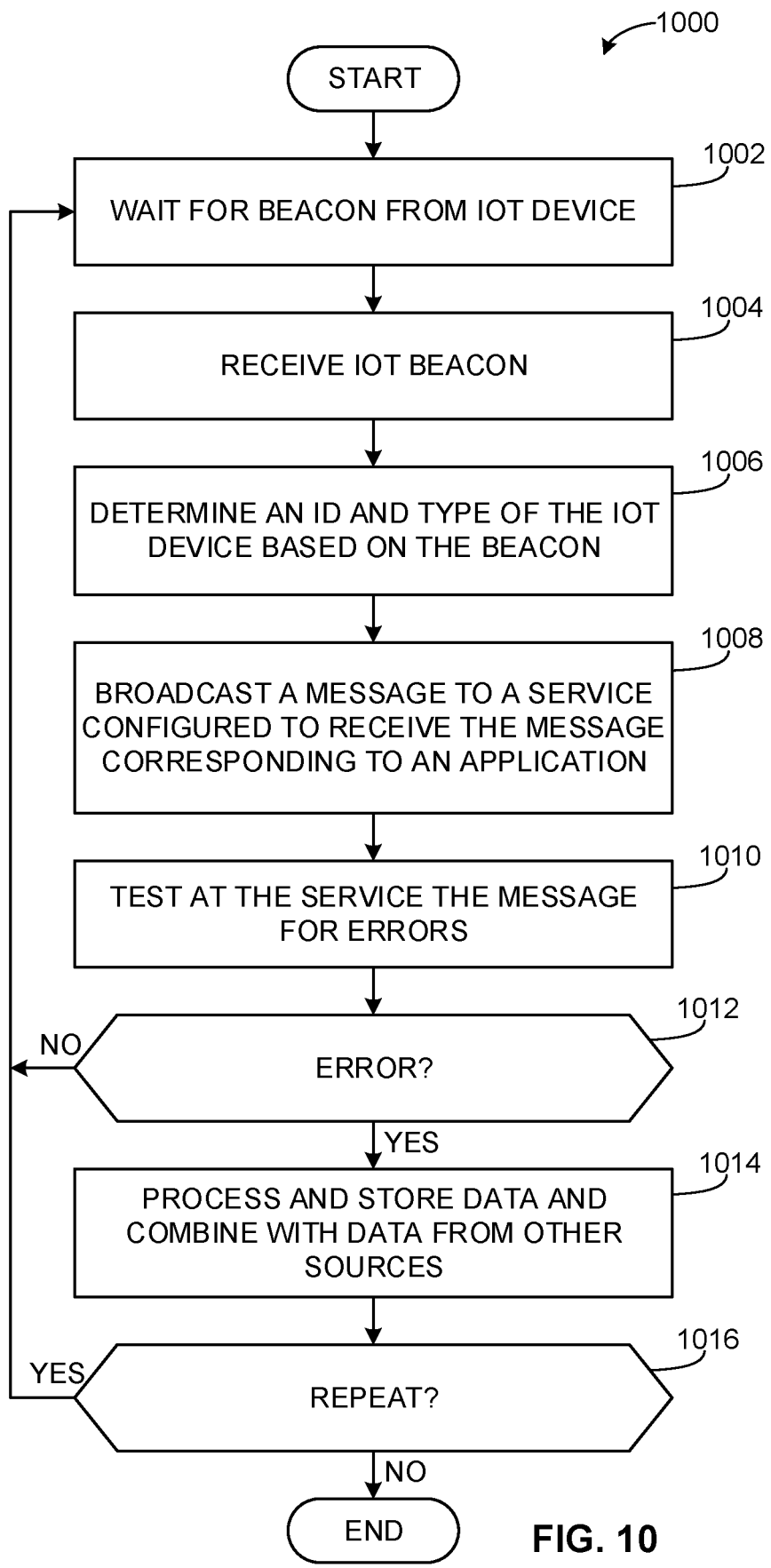
FIG. 10 is a flowchart representative of another example method that may be implemented by the example HVAC control system of FIG. 8.

While an example manner of implementing the example HVAC control system 800 of FIG. 8 is illustrated in FIGS. 9 and 10, one or more of the elements, processes and/or devices illustrated in FIG. 8 may be combined, divided, re-arranged, omitted, eliminated and/or implemented in any other way. Further, the example sensor interface 802, the example HVAC analyzer 804, the example HVAC control interface 806, the example external data analyzer 810, the example vehicle HVAC controller 340 and/or, more generally, the example HVAC control system 800 of FIG. 8 may be implemented by hardware, software, firmware and/or any combination of hardware, software and/or firmware. Thus, for example, any of the example sensor interface 802, the example HVAC analyzer 804, the example HVAC control interface 806, the example external data analyzer 810, the example vehicle HVAC controller 340 and/or, more generally, the example HVAC control system 800 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, sensor interface 802, the example HVAC analyzer 804, the example HVAC control interface 806, the example external data analyzer 810, and/or the example vehicle HVAC controller 340 is/are hereby expressly defined to include a tangible computer readable storage device or storage disk such as a memory, a digital versatile disk (DVD), a compact disk (CD), a BLU-RAY Disc™, etc. storing the software and/or firmware. Further still, the example HVAC control system 800 of FIG. 8 may include one or more elements, processes and/or devices in addition to, or instead of, those illustrated in FIG. 8, and/or may include more than one of any or all of the illustrated elements, processes and devices.

Flowcharts representative of example methods for implementing the HVAC control system 800 of FIG. 8 are shown in FIGS. 9 and 10. In this example, methods may be implemented using the machine readable instructions that comprise a program for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a BLU-RAY Disc™, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 9 and 10, many other methods of implementing the example HVAC control system 800 may alternatively be used. For example, the order of execution of the blocks may be changed, and/or some of the blocks described may be changed, eliminated, or combined.

As mentioned above, the example methods of FIGS. 9 and 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9 and 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method 900 of FIG. 9 begins as the vehicle 103 is being driven by an occupant (e.g., the occupant 260) that has the portable device 110. In this example, the occupant is the driver of the vehicle 103. In other examples, the occupant may be a passenger.

According to the illustrated example of FIG. 9, a sensor such as the sensor 240a, for example, is powered (block 902). In particular, the sensor may be an IOT sensor that is powered from mechanical energy harvesting. In other examples, a magnetic field generated by the portable device 110 and/or the vehicle 103 is used to power the sensor. Additionally or alternatively, in other examples, the sensor may be powered by radio frequency identification (RFID) power (e.g., RFID backscattering), or any other appropriate energy harvesting technology.

Next, in some examples, it is determined whether the sensor is to change from a low power mode (block 904). For example, the portable device 110 may trigger the sensor to exit a low power mode so that a measurement (e.g., a cabin measurement) may be transmitted. Additionally or alternatively, the sensor may be awakened from a low power mode if a threshold measurement is met (e.g., a temperature above a threshold temperature). If the sensor is to not change from the low power mode, control of the process returns to block 902. Otherwise, the process proceeds to block 906.

In this example, the sensor is awakened from the low power mode (block 906). In some examples, the portable device 110 transmits a signal to wake the sensor from the low power mode. For example, the sensor may turn on for a time duration periodically (e.g., turns on for 10 seconds every 10 minutes) and when the sensor detects the portable device 110, the sensor of the illustrated example may stay on continuously for a time duration. Additionally or alternatively, the sensor measuring a threshold (e.g., during a lower period measurement period) may wake the sensor from the low power mode. In some examples, if energy stored in the sensor is low, the sensor may employ load shedding to reduce energy consumption.

According to the illustrated example, sensor data from the sensor is received at the portable device 110 (block 908). In this example, the portable device 110 wirelessly receives the sensor data. Additionally or alternatively, the portable device and/or a vehicle control system (e.g., the vehicle control system 101) receives virtual sensor data and/or data from external sources and/or services (e.g., the web services 302).

The portable device 110 of the illustrated example analyzes the sensor data (block 909). In particular, the example HVAC analyzer 804 analyzes the sensor data to determine a condition within a vehicle cabin, for example.

In this example, the HVAC control system is controlled based on the analysis performed (block 910). For example, the HVAC system 300 is directed by the portable device 110 to control air temperature and/or recirculation/stuffiness parameters (e.g., what rate outside air is brought into the vehicle cabin). Additionally or alternatively, the HVAC system 300 of the illustrated example further relies on sensors (e.g., hard wired sensors) that are communicatively coupled to the HVAC system 300. In some examples, the portable device 110 directs the HVAC system 300 via an application of the portable device 110 that is developed to work with a specific sensor type and/or to have customized HVAC control logic.

Next, it is determined if the process is to end (block 912). If it is determined that the process is not to end, control of the process returns to block 902. Otherwise, the process ends. This determination may be based on whether an application (e.g., a custom HVAC application based on an SDK) being executed on the portable device 110 is active. Additionally or alternatively, this determination may be based on whether the vehicle is on. In some examples, this determination is at least partially based on whether an IOT sensor of the vehicle cabin is powered (e.g., inductively powered).

The example method 1000 of FIG. 10 begins as the portable device 110 is to be used to gather sensor data/measurements from an IOT sensor/device (e.g., the sensor 240*a*). In this example, the IOT sensor is disposed in the cabin 109 of the vehicle 103. In particular, the IOT sensor of the illustrated example is wireless and can be powered via mechanical energy harvesting or a magnetic field, which may be provided by the example portable device 110 or the vehicle 103.

According to the illustrated example, the portable device 110 waits for a beacon (e.g., a signal beacon, a transmitted beacon, etc.) from the IOT sensor (block 1002).

Next, the portable device 110 receives the beacon (block 1004). For example, the IOT sensor may begin transmitting the beacon when the IOT sensor has been directed to transmit the beacon. Additionally or alternatively, the beacon may be transmitted based on a condition (e.g., a detection condition such as motion, a measurement exceeding a threshold, etc.).

In this example, the portable device 110 determines an identification (ID) and device type (e.g., a type of IOT device) of the IOT sensor that sent the beacon (block 1006). In this example, the portable device 110 determines what kind of sensor the IOT sensor is as well an associated identifier of the IOT sensor (e.g., an IOT temperature sensor located near a rear passenger, etc.).

In some examples, the portable device 110 broadcasts a message to a service and/or application configured to receive the message in a corresponding application executed within the portable device 110 (block 1008). In particular, the portable device 110 of such examples routes sensor data and/or sensor information, as appropriate, to corresponding application(s), which may be running in parallel on the portable device 110.

In some examples, the aforementioned service tests the message for errors (block 1010). For example, the service may verify that the message includes complete sensor data and/or expected measurements and/or parameters (e.g., verifying that a temperature measurement was received instead of a pressure, etc.).

If an error was detected in the message (block 1012), control of the process returns to block 1002. Otherwise, the process proceeds to block 1014.

In this example, the service of the illustrated example processes and/or stores sensor data (block 1014). Additionally or alternatively, the service combines other data with the sensor data (e.g., data from other sources, data from web services, etc.).

Next, it is determined if the process is to be repeated (block 1016). If the process is to be repeated, control of the process returns to block 1002. Otherwise, the process ends.

Figure 11:
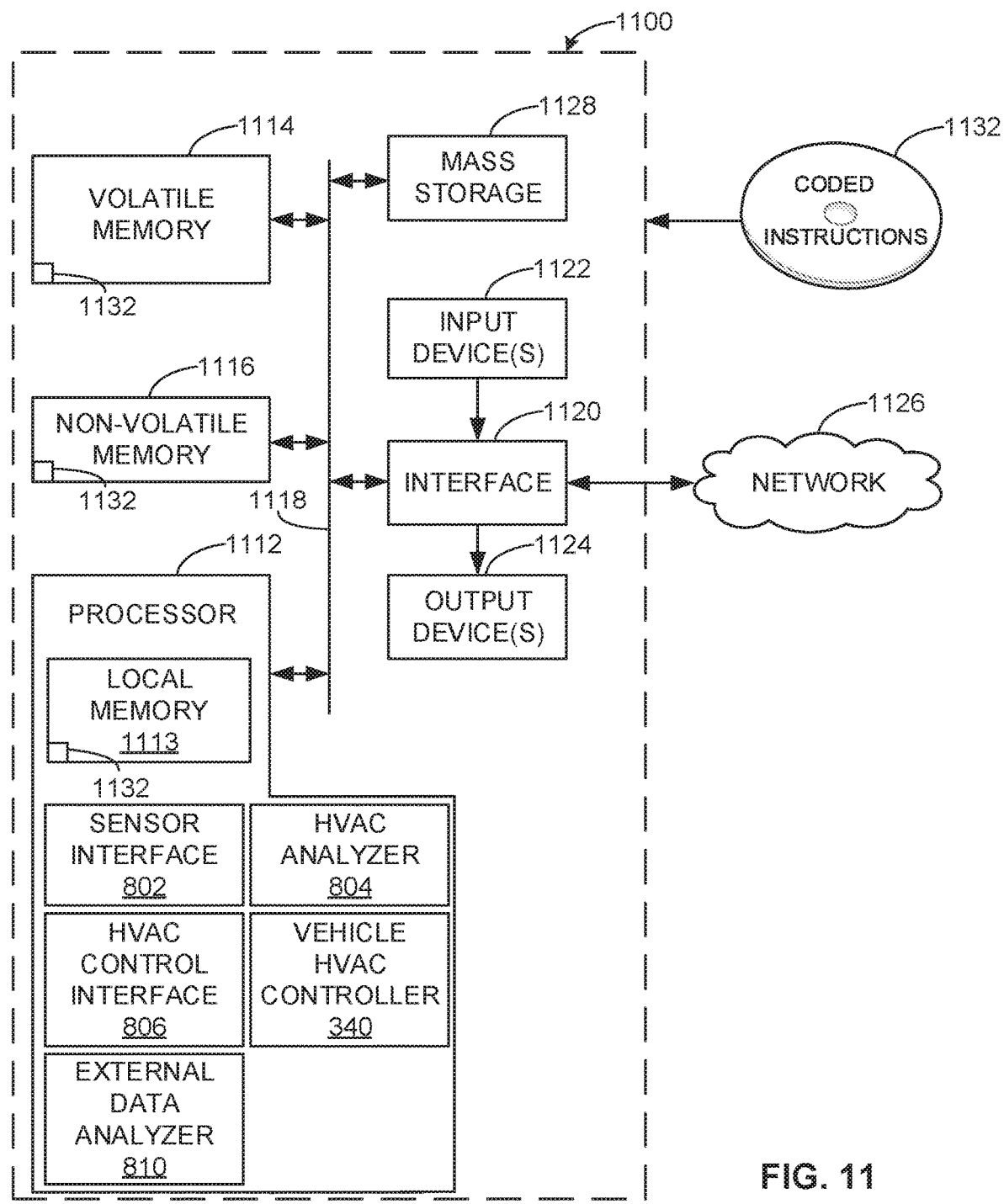
FIG. 11 is a processor platform that may be used to execute instructions to implement the methods of FIGS. 9 and/or 10 to implement the example HVAC control system of FIG. 8.

FIG. 11 is a block diagram of an example processor platform 1100 capable of executing instructions to implement the methods of FIGS. 9 and 10 and the HVAC control system 800 of FIG. 8. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). In this example, the processor 1112 also includes the example sensor interface 802, the example HVAC analyzer 804, the example HVAC control interface 806, the example external data analyzer 810, and the example vehicle HVAC controller 340. The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a touch sensing and locating device, a trackpad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, BLU-RAY Disc™ drives, RAID systems, and digital versatile disk (DVD) drives.

Coded instructions 1132 to implement the methods of FIGS. 9 and 10 may be stored in the mass storage device 1128, in the volatile memory 1114, in the non-volatile memory 1116, and/or on a removable tangible computer readable storage medium such as a CD or DVD.

From the foregoing, it will be appreciated that the above disclosed methods, apparatus and articles of manufacture enable a cost-effective and highly effective control of multi-dimensioned control systems. Further, the examples disclosed herein enable a high degree of customization for additional functionality and/or capabilities (e.g., using new or different sensor technologies).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are generally directed to HVAC systems of vehicles, the examples disclosed herein may be applied to any appropriate application, sensor system, sensor system utilized by a portable device, and/or control system.

What is claimed is:

1. An apparatus comprising:
    a portable device interface of a vehicle, the portable device interface to be communicatively coupled with a portable device, the portable device communicatively coupled to a sensor that outputs biometric data pertaining to an occupant of the vehicle, the portable device to generate signals based on the biometric data, the signals including heating ventilation and air conditioning (HVAC) settings;
    an HVAC control system of the vehicle, the HVAC control system is to be communicatively coupled to the portable device interface; and
    a processor to control the HVAC control system based on the signals received at the portable device interface from the portable device.

2. The apparatus as defined in claim 1, wherein the sensor is a first sensor, and further including a second sensor that is to wirelessly communicate with the portable device.

3. The apparatus as defined in claim 2, wherein the second sensor includes a passively powered sensor proximate or within a cabin of the vehicle.

4. The apparatus as defined in claim 3, wherein the second sensor includes an environmental condition sensor to measure at least one of an atmospheric property, a humidity, a solar radiation level, air movement or a chemical concentration.

5. The apparatus as defined in claim 1, wherein the portable device generates the signals by analyzing the biometric data.

6. The apparatus as defined in claim 1, wherein the signals further include input command signals.

7. The apparatus as defined in claim 1, wherein the signals further include a measurement of a cabin parameter.

8. The apparatus as defined in claim 1, wherein the portable device receives an environmental condition that is external to the vehicle from a web service, and the processor is to control the HVAC control system at least partially based on the environmental condition.

9. The apparatus as defined in claim 1, wherein the biometric data includes brain activity of the occupant.

10. The apparatus as defined in claim 1, wherein the biometric data includes facial recognition data of the occupant.

11. The apparatus as defined in claim 1, wherein the biometric data includes a skin temperature of the occupant.

12. An apparatus comprising:
    a portable device having a vehicle communication interface to communicate with an interface system of a vehicle;
    a sensor interface of the portable device in wireless communication with a sensor disposed within or proximate a cabin of the vehicle, the sensor to output biometric data pertaining to an occupant of the vehicle, the portable device to generate signals based on the biometric data, the signals including heating ventilation and air conditioning (HVAC) settings; and
    a processor of the portable device to control an HVAC control system of the vehicle via the vehicle communication interface based on the signals from the portable device.

13. The apparatus as defined in claim 12, further including an external sensor that measures a condition external to the vehicle, the external sensor communicatively coupled to the HVAC control system or the sensor interface.

14. The apparatus as defined in claim 12, further including an external web interface of the portable device to obtain an external environmental condition, wherein the processor controls the HVAC control system further based on the obtained external environmental condition.

15. The apparatus as defined in claim 12, further including a wireless power transfer device to inductively power the sensor.

16. A tangible machine readable medium comprising instructions, which when executed, cause a processor of a portable device to at least:
    determine a heating ventilation and air conditioning (HVAC) setting for a vehicle based on biometric data pertaining to an occupant of the vehicle, the biometric data received from a sensor communicatively coupled to the portable device; and
    provide the HVAC setting to an HVAC system of the vehicle.

17. The machine readable medium as defined in claim 16, wherein the instructions cause the processor to:
   obtain an external environmental condition; and
   direct the HVAC system further based on the external environmental condition.

18. The machine readable medium as defined in claim 17, wherein the environmental condition includes an exchange between inside a cabin of the vehicle and outside the cabin, the exchange including at least one of radiation, conduction, convection, leakage, HVAC energy and energy inputs to the cabin from the HVAC system.

19. The machine readable medium as defined in claim 16, wherein the biometric data includes sensor measurements taken within a cabin of the vehicle.

20. The machine readable medium as defined in claim 16, wherein the biometric data includes sensor measurements taken external to a cabin of the vehicle.

21. The machine readable medium as defined in claim 16, wherein the HVAC setting is further based on at least one of a thermal comfort model, a user preference, or a stuffiness model.

* * * * *